United States Patent
Salman

[11] Patent Number: 6,113,055
[45] Date of Patent: Sep. 5, 2000

[54] SIGN POST COUPLER

[76] Inventor: Mark T. Salman, 7341 W. Friendly Ave., Greensboro, N.C. 27410

[21] Appl. No.: 09/238,057

[22] Filed: Jan. 27, 1999

Related U.S. Application Data

[63] Continuation-in-part of application No. 08/532,544, Sep. 25, 1995, abandoned.

[51] Int. Cl.[7] .......................... F16M 13/00; F16M 11/00; F16D 9/00; F16P 5/00
[52] U.S. Cl. ............................................. 248/548; 403/2
[58] Field of Search ...................... 248/548, 909, 248/530, 900, 507, 508, 156, 545; 52/297, 298, 170; 403/2

[56]             References Cited
           U.S. PATENT DOCUMENTS

| | | |
|---|---|---|
| 3,820,906 | 6/1974 | Katt ............................................ 403/2 |
| 3,846,030 | 11/1974 | Katt ............................................ 403/2 |
| 4,055,737 | 10/1977 | Rasmussen ................................ 200/51 |
| 4,759,161 | 7/1988 | Kucyk, Jr. et al. . |
| 4,850,565 | 7/1989 | Moreno . |
| 4,858,876 | 8/1989 | Moreno . |
| 4,862,823 | 9/1989 | Hughes . |
| 5,214,886 | 6/1993 | Hugron . |
| 5,425,593 | 6/1995 | Buehler . |
| 5,480,121 | 1/1996 | Rice et al. . |
| 5,782,040 | 7/1998 | McCartan .................................... 403/2 |
| 5,855,443 | 1/1999 | Faller et al. ................................ 403/2 |

*Primary Examiner*—Ramon O. Ramirez
*Assistant Examiner*—Jon A Szumny
*Attorney, Agent, or Firm*—Richard C. Litman

[57] ABSTRACT

The sign post coupler is a breakaway coupler for use with highway signs having a sign post and a ground post. The coupler is a hollow, tubular, integral coupler made from ductile iron and having a sign post socket, a ground post socket, and a shear section joining the two sockets. The sign post socket has a bottom wall and at least one side wall extending vertically for 360° around the bottom wall, the socket defining a cavity for receiving and supporting one end of the sign post. The ground post socket has a top wall and at least one side wall depending vertically for 360° around the bottom wall, the socket defining a cavity for receiving and being supported by one end of the ground post. The sockets taper inwardly towards the center of the coupler to define a shear section having an annular groove of reduced thickness defined therein. The shear section breaks upon impact of a vehicle with the sign post to separate the post sections.

19 Claims, 8 Drawing Sheets

SIGN POST COUPLER

CROSS-REFERENCE TO RELATED APPLICATION

This is a continuation-in-part of my prior application, Ser. No. 08/532,544, filed Sep. 25, 1995, abandoned.

BACKGROUND OF THE INVENTION

1. FIELD OF THE INVENTION

The present invention relates to highway sign supports, and particularly to a coupler for attachment of a highway sign post to a ground or anchor post, the coupler having a shear section which causes the sign post to break away from the ground post upon impact by a motor vehicle.

2. DESCRIPTION OF THE RELATED ART

In recent years state and local highway departments have become uncreasingly concerned with safety of vehicle passengers. Highway signs can cause great injury if struck by a car, truck, or other vehicles. Passenger cars, even while traveling at low speeds, can cause terrific impact to road side sign posts when struck. Such sign posts may cause damage to the vehicle, the occupants of the vehicles, and pedestrians.

Conventional breakaway sign posts generally have a sign post which is U-shaped in cross section with a relatively short, separate ground post which is driven into the ground connected to the sign post by a breakaway section. The longer, upper sign post section to which the sign is attached, extends vertically some eight to ten feet. The breakaway device joins the two post sections and when struck by a vehicle, the breakaway mechanism car be replaced and the sign may be restored to its previous position.

Many prior art devices have utilized shear pins which will break upon a calculated amount of applied force, as from careening vehicle. However, since shear pins can be incorrectly used or replaced by inexperienced workers, either the sign post may fail before the breakaway section or the breakaway section may fail to operate as intended.

U.S. Pat. No. 4,759,161, issued Jul. 26, 1988 to Kucyk, Jr., et al., describes a breakaway sign post which includes a foundation post having a projection and a sign post mounted on the projection by a sleeve. A shear pin extends transversely through the sleeve, and preferably also through an eyebolt mounted on the projection, the eyebolt also having a shear point between the eye and the shaft.

U.S. Pat. No. 4,850,565, issued Jul. 25, 1989 to A. M. Moreno, shows a ground post with a U-shaped channel at the top of the post with a first cylindrical member welded inside the channel, a U-shaped channel having a second cylindrical member welded to the inside of the channel, and a shear pin extending through aligned bores in the first and second cylindrical members. U.S. Pat. No. 4,858,876, issued August 22, 1989, also to Moreno, discloses a similar structure in which the intermediate portion of the shaft of the shear pin is hexagonal in cross section.

U.S. Pat. No. 5,214,886, issued Jun. 1, 1993 to D. P. Hugron, shows a breakaway connector having a cross sectional shape identical to the cross sections of the sign post and the ground post, the connector being bolted to the sign post and the ground post and having a section between the two posts weakened by a groove which is horizontal through the web and side walls, but vertical in the fold between the side walls and the flanges. Part of the connector breaks on impact, but the sign post and ground post are not completely severed.

U.S. Pat. No. 5,425,593, issued Jun. 20, 1995 to R. J. Buehler, discloses a sleeve for connecting the sign post to the ground post, the sleeve having upper and lower receptacles, the posts being partly disposed within the receptacles. One of the embodiments, shown in FIG. 20, has a narrowed diameter for easy breakaway. It will be noted that the invention in Buehler is not described as a breakaway coupler, but as a sleeve for connecting one post to the other, regardless of how the posts became separated. It will be further noted that the description of the embodiment shown in FIG. 20 of the Buehler patent does not specify the materials from which it is made, does not describe the narrowed diameter as being hollow, does not describe a bore extending through the coupler longitudinally, and does not describe any slots defined in the receptacles.

U.S. Pat. No. 5,480,121, issued Jan. 2, 1996 to Rice, et al., describes a breakaway connector having two U-shaped sections bolted to the sign post and the ground post, the U-shaped sections being joined by a hollow stud welded to the web of each connector. The hollow stud has an annular groove about its center and two aligned bores extending transversely through the groove. U.S. Pat. No. 4,862,823, issued Sep. 5, 1989 to R. K. Hughes, teaches signs for marking boundaries which bend when struck by a reel type lawn mower, the sign having a ground section and a sign section joined by a flexible sleeve.

None of the above inventions and patents, taken either singularly or in combination, is seen to describe the instant invention as claimed. Thus a sign post coupler solving the aforementioned problems is desired.

SUMMARY OF THE INVENTION

The sign post coupler is a breakaway coupler for use with highway signs having a sign post and a ground post. The coupler is a hollow, tubular, integral coupler made from ductile iron and having a sign post socket, a ground post socket, and a shear section joining the two sockets. The sign post socket has a bottom wall and at least one side wall extending vertically for 360° around the bottom wall, the socket defining a cavity for receiving and supporting one end of the sign post. The ground post socket has a top wall and at least one side wall depending vertically for 360° around the bottom wall, the socket defining a cavity for receiving and being supported by one end of the ground post. The sockets taper inwardly towards the center of the coupler to define a shear section having an annular groove of reduced thickness defined therein. The shear section breaks upon impact of a vehicle with the sign post to separate the post sections.

The ductility of the iron permits the coupler to be elongated to an appreciable degree before rupture occurs. Hence, low speed impacts, such as wind, random efforts of vandals to break the coupler, and other forms of constant pressure applied to the sign post will result in failure of the sign post, which will bend the sign post rather than break the coupler.

Advantageously, the cross section of the shear section is hollow and circular, the shear section having a bore defined therein extending through the bottom wall of the sign post socket, the shear section, and the top wall of the ground post socket. The circular cross section results in rupture of the shear section upon high speed impact with the sign post from any angle up to 360° around the post. Since the shear section is hollow, a flexible member may be inserted through the hollow shear section and secured either to the opposing sockets or opposing posts to prevent the sign post from flying off in random directions when the shear section breaks, thereby protecting the flexible member from damage due to corrosion or accidental severance. The annular groove is semicircular, having a radius substantially equal to the depth of the groove, so that the shear point may be adjusted by placing a strap in the groove to increase the cross sectional area of the shear section.

The sockets define cavities which have a cross sectional shape similar to but slightly larger than the cross section of the respective sign and ground posts, so that the posts are snugly received in the cavities. A pair of aligned slots are defined transversely through each socket so that the posts may be fastened to the coupler by bolts or other means. The fasteners are not necessary to the functioning of the coupler, the sockets being sufficient by themselves to support the sign post vertically on the ground post, the slots being provided so that the posts may be secured from theft and random acts of vandalism. Advantageously, the sockets (1) protect the cross section of the sign post from damage; and (2) prevent damage to the coupler and posts or failure of the coupler to function in its breakaway role due to improper installation of bolts by overtorquing or insertion of a shear pin through the wrong holes.

Accordingly, it is a principal object of the invention to provide a sign post coupler for highway signs which reduces the damage to both a motor vehicle and the cross section of the sign post upon impact by providing a coupler having sockets adapted to the cross sectional shapes of the sign post and ground post connected by a shear section having an annular groove which ruptures in order to separate the sign post from the ground post when struck from any angle perpendicular to the post.

It is another object of the invention to reduce damage to a highway sign post or failure of a breakaway sign post coupler resulting from improper installation by providing a sign post coupler which may be quickly and easily installed by sliding a coupler ground post socket onto the ground post and inserting the sign post into the coupler's sign post socket.

It is a further object of the invention to protect a breakaway sign post coupler from damage resulting from wind, random acts of vandalism or rupture from the application of constant pressure by providing a sign post coupler made from iron having sufficient ductility to prevent rupture at the breakaway point unless impacted by a vehicle traveling at speed great enough to ordinarily entail a risk of personal injury or vehicular damage.

Still another object of the invention is to provide a breakaway sign post coupler in which the sign post may be tethered to the ground post to prevent damage from random propulsion or dispersion of the sign post upon rupture of the breakaway joint by a flexible element protected from corrosion or accidental severance by disposing the tether in the bore of a hollow shear section joining the sign post to the ground post.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
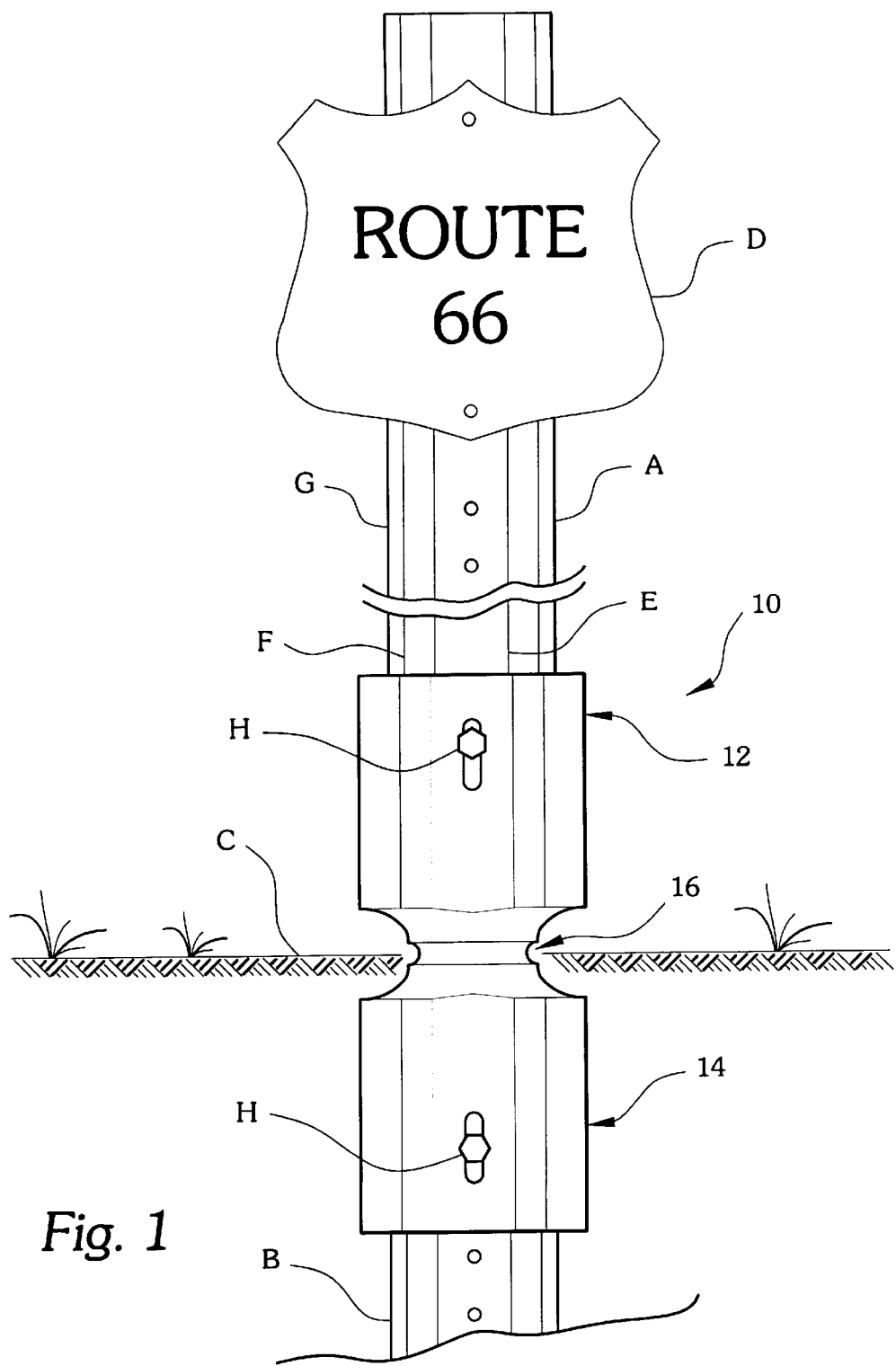
FIG. 1 is a fragmented, environmental view of a sign post coupler according to the present invention.

The present invention is a breakaway sign post coupler, designated generally as 10 in FIGS. 1 through 11. The sign post coupler 10 joins a highway sign post A to a ground post B which is buried in the ground C. The ground post B has a length sufficient to provide a stable base for the sign post A, usually at least three feet. The sign post A may be eight to ten feet long, and bears an appropriate sign D bolte to its upper half.

The sign post coupler 10 is a hollow, tubular, integral unit having a sign post socket 12 adapted for receiving an end of the sign post A, a ground post socket 14 adapted for receiving an end of the ground post B, and a shear section 16 disposed between the sockets 12, 14. The shear section 16 is designed to break when the sign post A is impacted by a motor vehicle. The sign post coupler 10 is made from a metal alloy having sufficient strength to withstand wind and weak shear forces, such as might be exerted by vandals attempting to break the sign post A away by hand, but the alloy in combination with the shape of the shear section 16, will break upon impact by a moving motor vehicle. In the preferred embodiment, the sign post coupler 10 is made from 65-45-12 ductile iron, 65-45-12 representing the tensile strength in thousands of pounds per square inch, the yield strength in thousand of pounds per square inch, and the percent elongation, respectively.

A preferred embodiment of the sign post coupler 10 adapted for supporting a conventional U-shaped sign post A on a U-shaped ground post B is shown in more detail in FIGS. 2 through 5. Many highway signs are mounted on conventional U-shaped posts A, having a web E, a pair of side walls F extending from the web, and a pair of flanges G extending from the side walls, the flanges G being parallel to the web E. The side walls F are not exactly perpendicular to the web E, but are angled outward from the web E and away from each other, so that the plane in which the side walls F are disposed intersect on the side of the web E opposite to the side walls F.

The sign post socket 12 includes a bottom wall 18 and a plurality of side walls 20 defining a cavity 22 having a cross-sectional shape and depth adapted to receive a conventional U-shaped highway sign post A, the side walls 20 being joined together 360° about the circumference of the cavity 22 to provide support for the sign post A from all directions. As seen in the top vies of FIG. 3, the cross-sectional shape of the cavity 22 includes a trapezoid, the side walls 20 being adapted for abutting the web E and side walls F of the sign post A, merged at the open end of the U to one of the long sides of a long, rectangular slot, the side walls 20 abutting the flanges G and closing the mouth of the U-shaped sign post A. The depth of the cavity 22 is adapted to receive a sufficient length of an end of the sign post A to support the post vertically, while the side walls 20 of the socket 12 abut the post A to prevent the post A from rotating about a vertical axis under a torque exerted by the wind.

Figure 2:
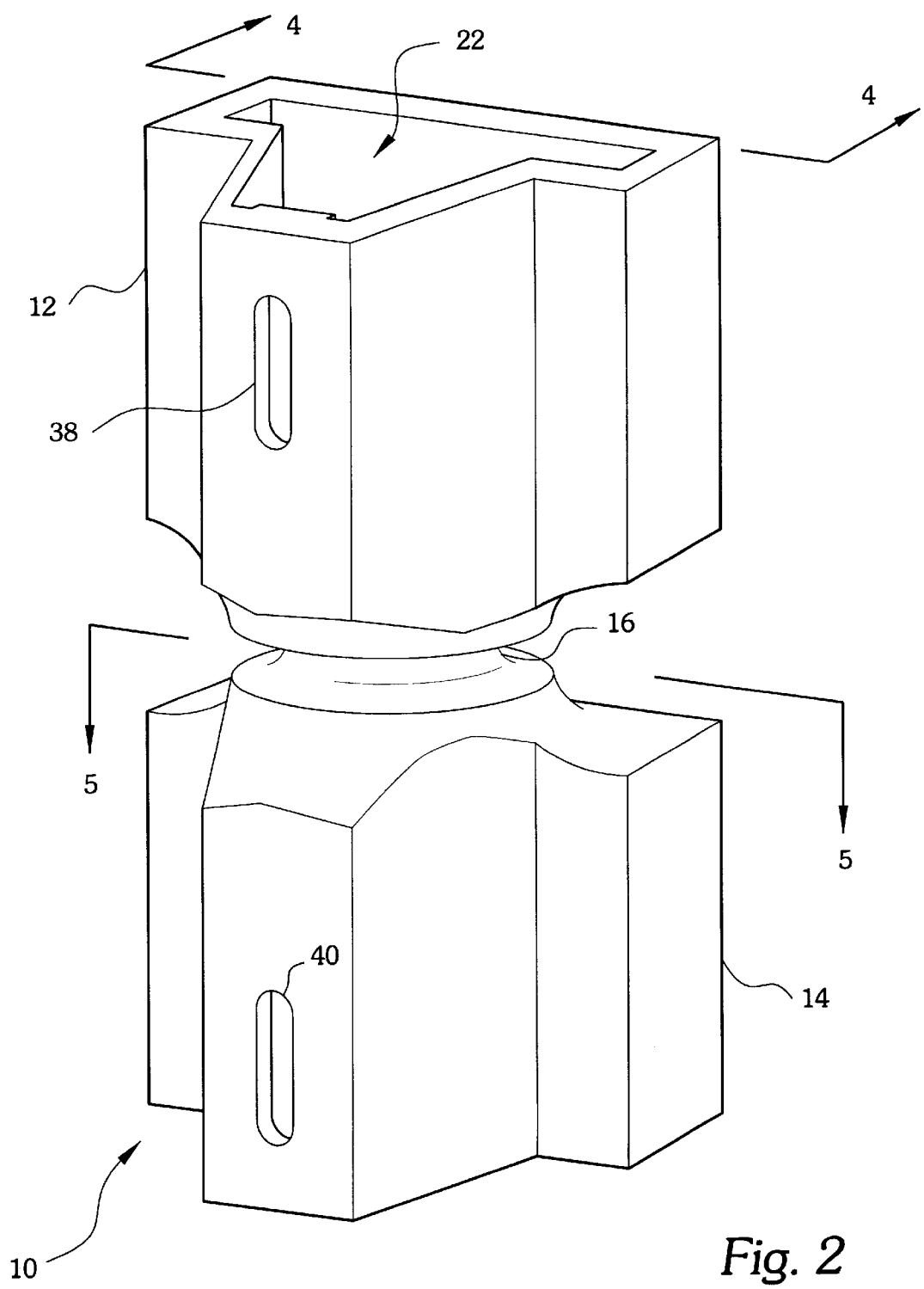
FIG. 2 is a perspective view of a sign post coupler according to the present invention.
Figure 3:
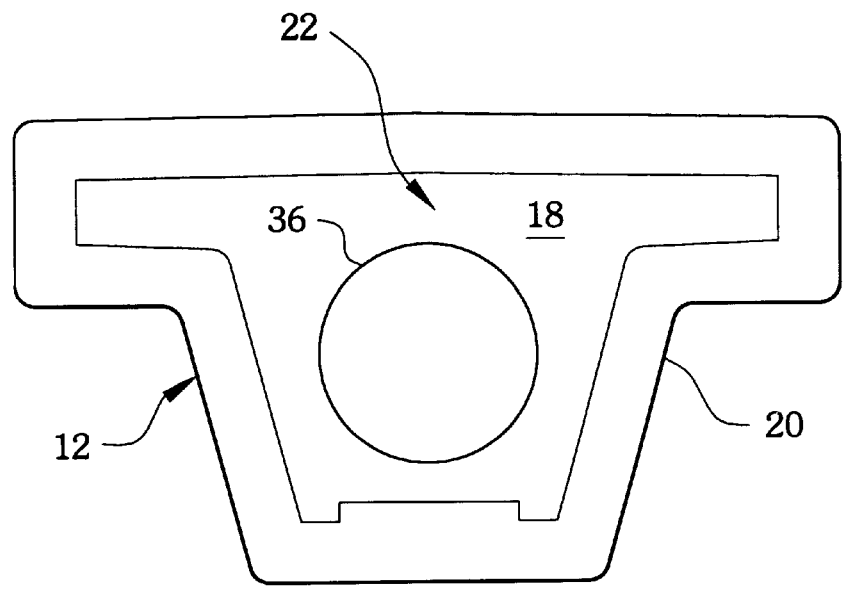
FIG. 3 is a plan view of a sign post coupler according to the present invention.
Figure 5:
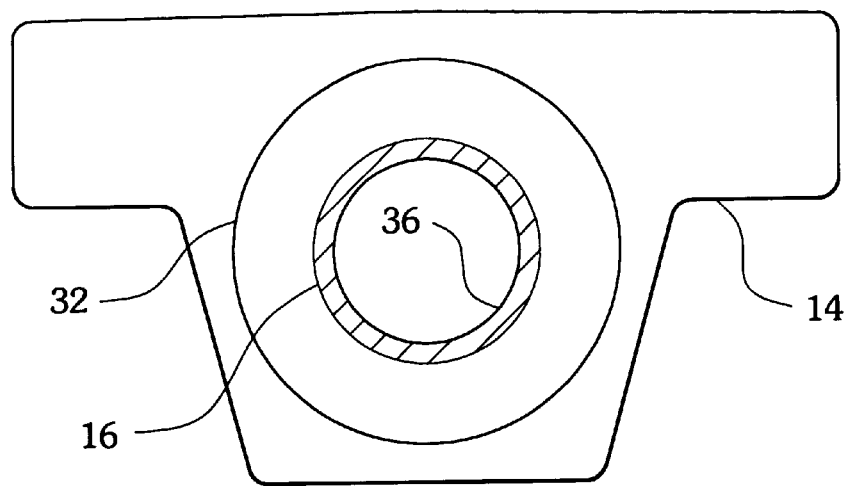
FIG. 5 is a horizontal section view along the line 5—5 of FIG. 2.
Figure 4:
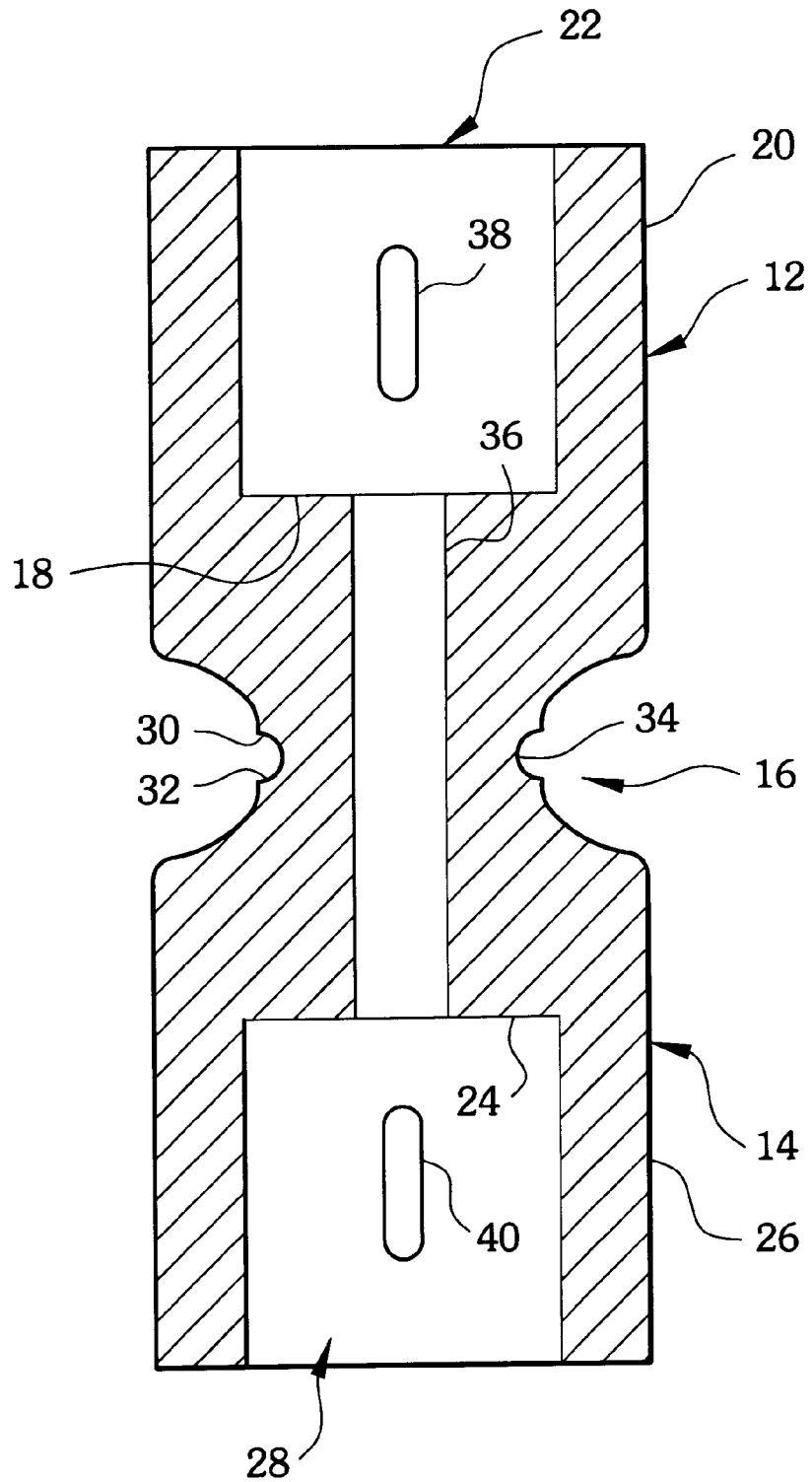
FIG. 4 is a vertical section view along the line 4—4 of FIG. 2.

As seen in FIGS. 2, 4, and 5, the ground post socket 14 has a structure symmetrical to the sign post socket 12, including a top wall 24 and a plurality of sidewalls 26 defining a cavity 28 having a cross-sectional shape and depth adapted for supporting the coupler on a conventional U-shaped highway ground post B.

As shown in FIG. 4, the sign post socket 12 and the ground post socket 14 are joined by the shear section 16. The bottom wall 18 of the sign post socket tapers downward and inward about its perimeter to form a first circular base 30. The top wall 24 of the ground post socket 14 tapers upward and inward about its perimeter to form a second circular base 32. The shear section 16 is a short, cylindrical section defined between the first 30 and second 32 circular bases. The wall of the cylinder has an annular groove 34 defined therein, the groove 34 being semicircular, the circle having a radius about equal in length to the depth of the groove 34 and a diameter about equal to the height of the cylinder.

The coupler has a cylindrical bore 36 of uniform diameter defined therein extending through the bottom wall 18 of the sign post socket 12, the shear section 16, and the top wall 24 of the ground-post socket 14. Thus, the coupler 10 is hollow and tubular throughout its length. The annular groove 34 is defined in the exterior surface of the shear section. The wall of the shear section 16 is thin in comparison to the walls of the sockets 12, 14. The shear section 16, being circular in cross section, as shown in FIG. 5, will break upon the sign post A being impacted from any angle 360° about its circumference. The hollow, cylindrical cross section and the ductility of the alloy lend the shear section 16 strength in tension and compression and sufficient elongation to withstand shear forces, but render the shear section 16 frangible in shear or torsion due to the momentum generated by the mass of a motor vehicle moving at highway speed.

Figure 11:
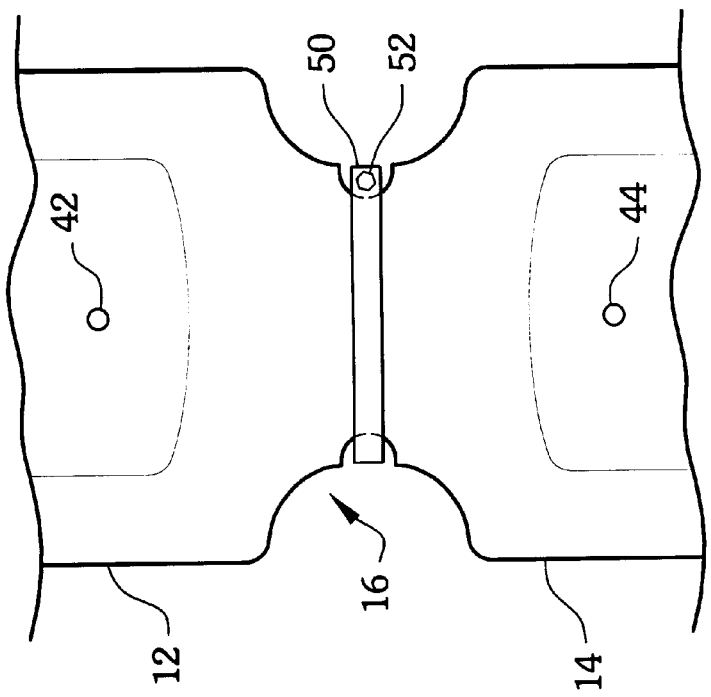
FIG. 11 is a fragmented, front view of a sign post coupler according to the present invention with an adjustable strap around the shear section.

The coupler 10 may have a pair of slots 38 aligned transversely in the sign post socket 12 and a second pair of slots 40 aligned transversely through the ground post socket 14, the slots 38, 40 being adapted for receiving a bolt H or other fastener extending transversely through the sockets 12, 14 and posts A, B respectively. Alternatively, the coupler 10 may have pairs of aligned holes 42, 44, as shown in FIG. 11, for the same purpose. The slots 38, 40 or holes 42, 44 are not necessary for the functioning of the coupler 10. They are being provided for securing the coupler 10 to the ground post B and the sign post A to the coupler A to discourage casual attempts at theft or other vandalism. The depth and cross-sectional shape of the cavities 22, 28 are sufficient to support the coupler 10 and sign post A, the depth of the cavities 22, 28 being about three inches.

Advantageously, the shape of the cavity 22 protects the cross section of the sign post A upon impact from a vehicle. For example, if a vehicle were to strike the flange G from the front of the post A at an angle, the side walls 20 exert an opposing force at the base of the flange G resisting bending of the flange G, thereby protecting the cross section of the post A. If the coupler 10 lacked a socket 12 enclosing the end of the post A from all sides, the force of the impact may cause the flange G to bend before the coupler 10 broke, requiring replacement of the post A as well as the coupler 10. The sockets 12, 14 also prevent failure due to installer error, the shear section 16 being integral with the sockets 12, 14, and not requiring the installation of shear pins or the torquing of bolts.

In operation, the coupler 10 is mounted by placing the ground post socket 14 over an end of the ground post B and driving the ground post B into the ground C to a depth sufficient to anchor the post B, the shear section 16 being level with the ground C and the sign post socket 12 extending above ground level. The sign post A is inserted into the sign post socket 12, and a sign D is bolted to the post A. Bolts H may be used to secure the posts A, B to the coupler 10, if desired. When the sign post A is struck by a vehicle, the shear section 16 breaks, separating the sign post A from the ground post B.

Figure 6:
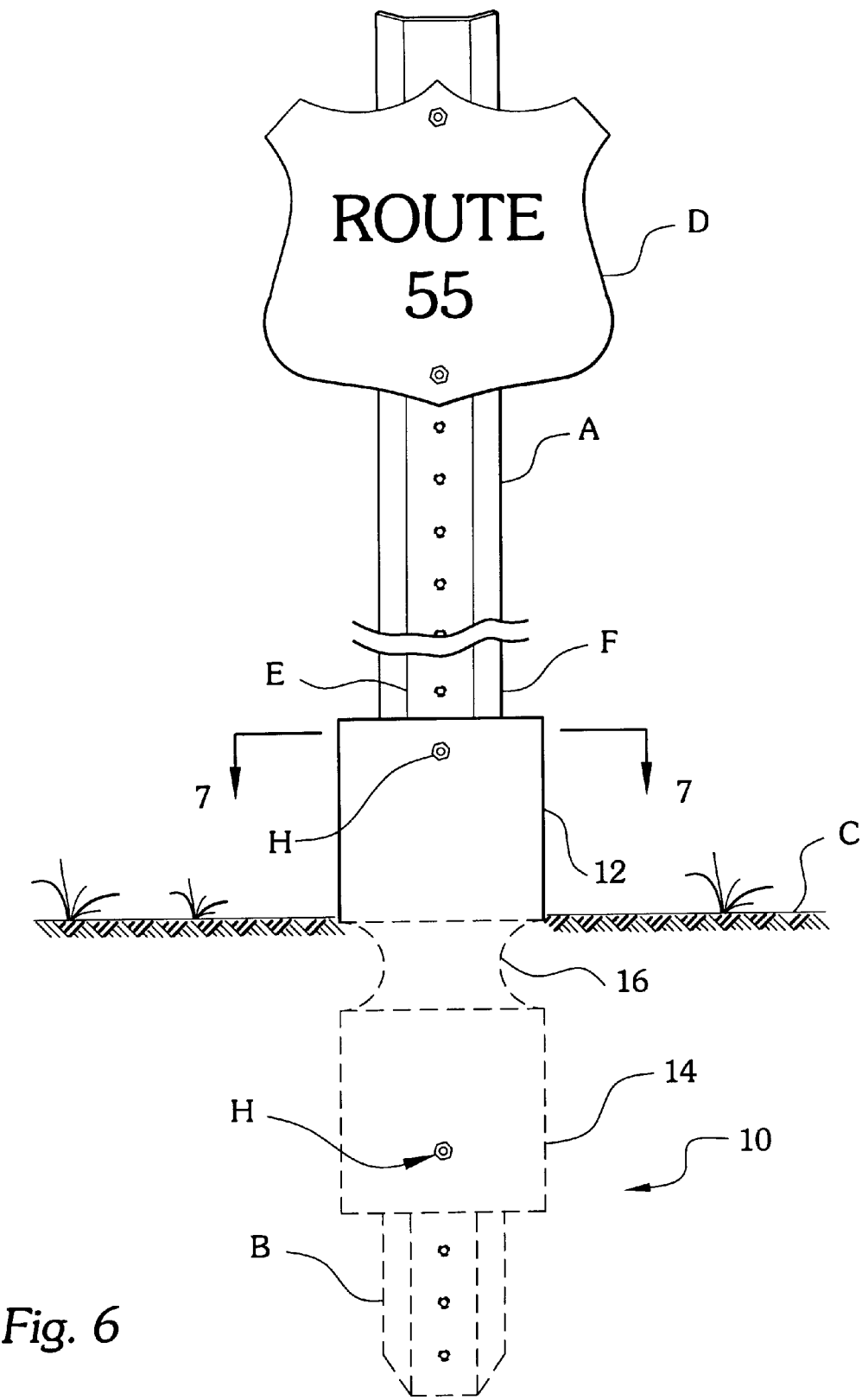
FIG. 6 is a fragmented, perspective view of an alternative embodiment of a sign post coupler according to the present invention.
Figure 7:
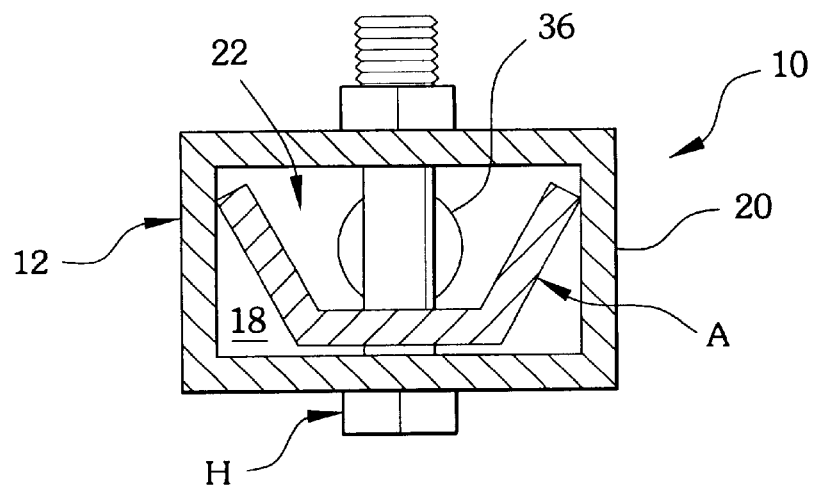
FIG. 7 is a horizontal section view along the line 7—7 of FIG. 6.
Figure 8:
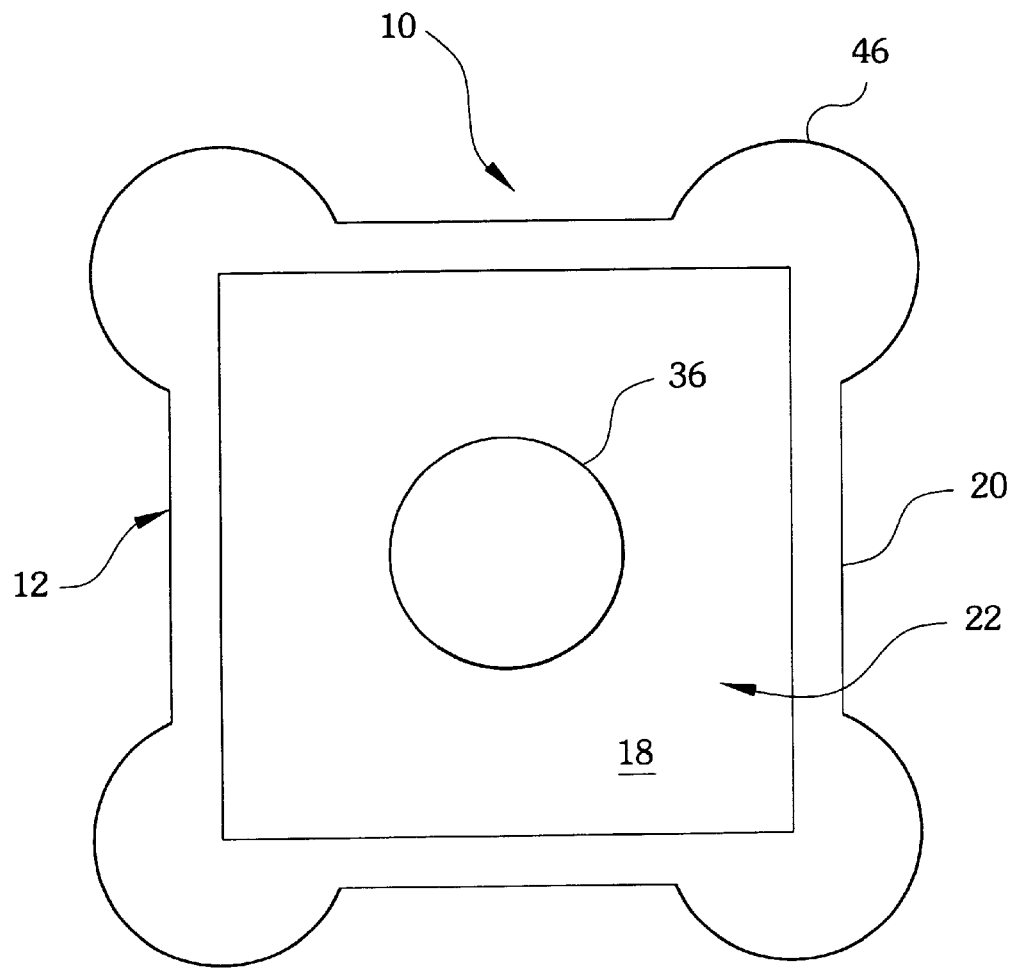
FIG. 8 is a plan view of a second alternative embodiment of a sign post coupler according to the present invention.

The basic sign post coupler 10 having been described, a number of variations and modifications of the coupler 10 may be made within the scope of the present invention. The sign post and ground post sockets 12, 14 may have a variety of shapes in cross section. FIGS. 6 and 7 show an alternate embodiment of the invention in which the cross-sectional shape of the cavities 22, 28 defined by the side walls 20, 26 is rectangular. FIG. 8 shows a top view of another embodiment of the coupler 10 in which the side walls 20 define a cavity 22 which is square in cross section, the ground post socket 14 being symmetrical with the sign post socket 12. In the embodiment shown in FIG. 8, the corners 46 of the socket 12 are reinforced with an extra thickness of material to withstand the torsional stress imparted on the corners 46 of the socket 20 upon impact of a vehicle with the sign post A, so that externally the walls 20 appear to be lobular at the corners 46. The sockets 12, 14 may also describe cavities 22, 28 which are circular in cross section to support a cylindrical sign post A (not shown), a bolt H being inserted transversely through the sign post socket 12 and post A to prevent the post from rotating in the wind. In each of these embodiments, the sockets 12, 14 taper to a cylindrical shear section 16 having a cylindrical bore 36 as described with respect to the embodiment shown in FIGS. 1 through 5.

Figure 9:
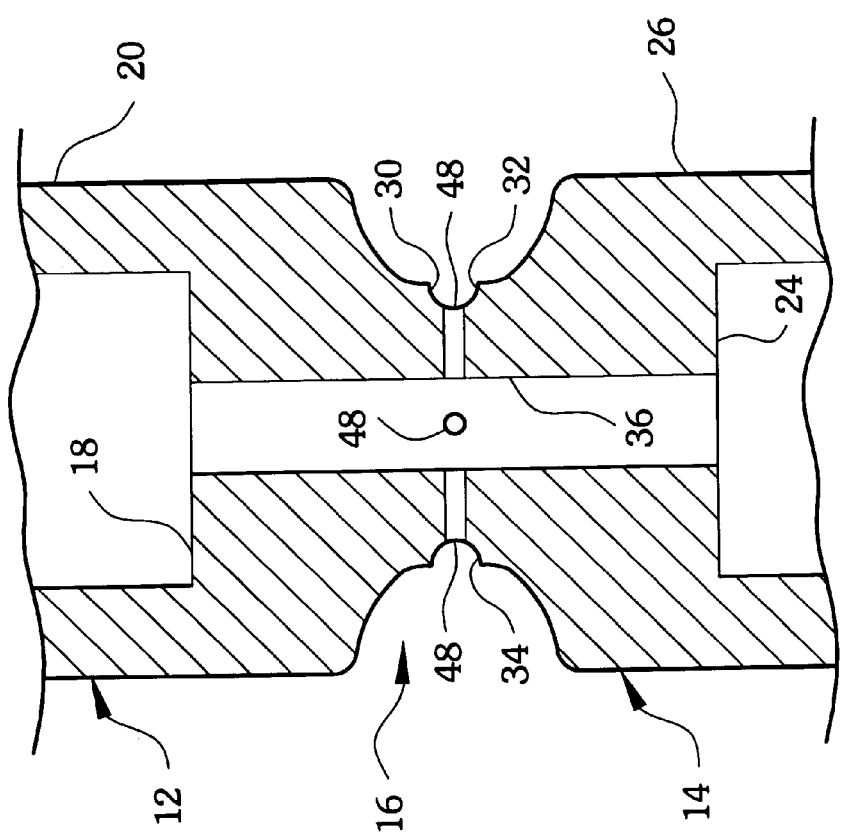
FIG.9 is a fragmented, vertical section view of an alternative embodiment of the shear section of a sign post coupler according to the present invention.

The shear section 16 may be further weakened by defining a plurality of holes 48 transversely through the annular groove 34, as shown in FIG. 9. Alternatively, the shear section 16 may be strengthened by wrapping an adjustable metal strap 50 secured by a fastener 52 around the annular groove 34 as shown in FIG. 11, thickening the shear section 16 in order to present a greater area cross section, requiring a greater force to sever the sign post socket 12 from the ground post socket 14.

Figure 10:
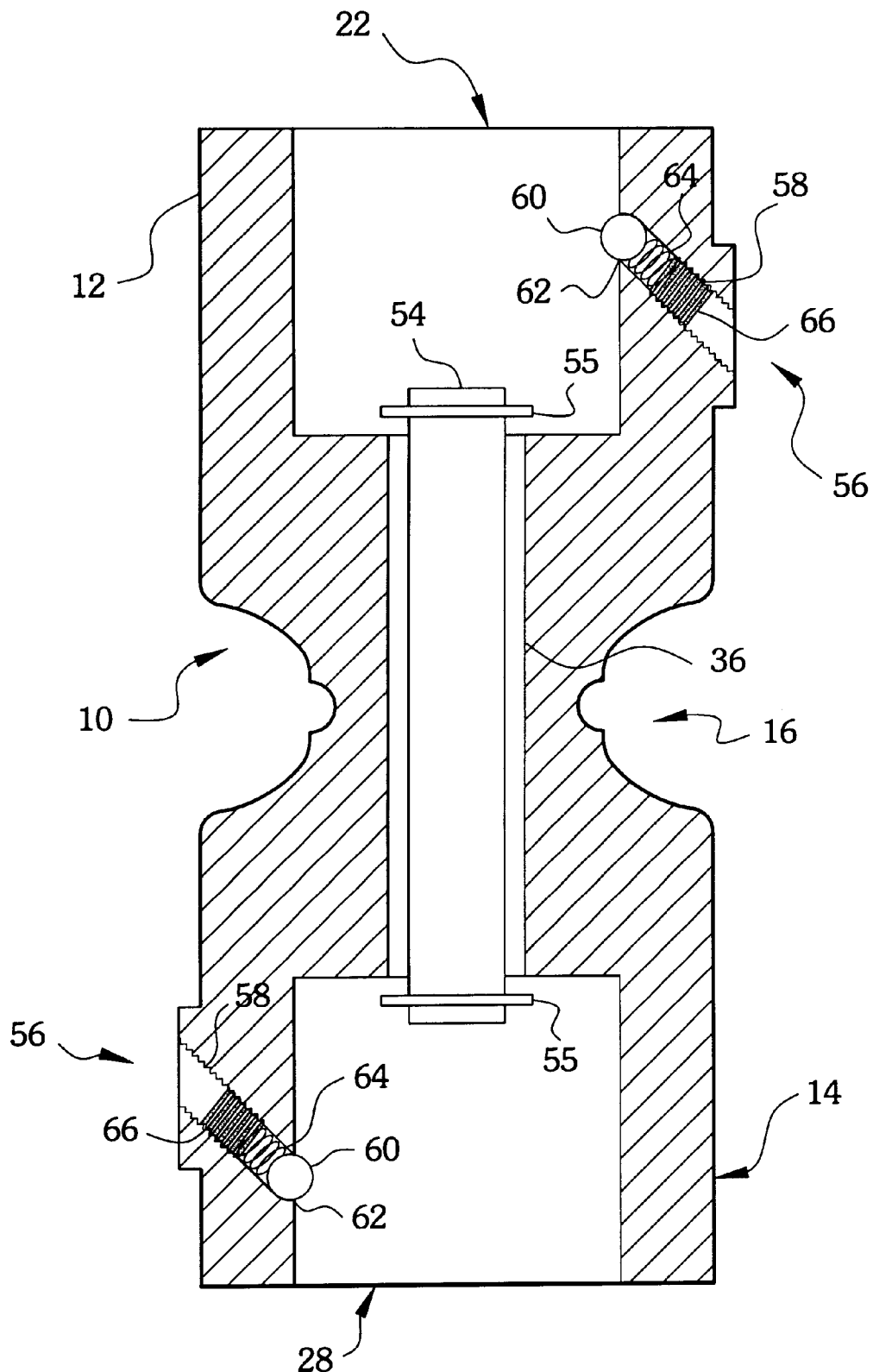
FIG. 10 is an alternative embodiment showing a self-locking mechanism and a flexible element disposed in the shear section.

The cylindrical bore 36 permits a flexible element 54, which may also be resilient, to be disposed in the bore 36, extending from the sign post socket 12 through the bottom wall 18, the bore 36, the top wall 24, and into the ground post socket 14, as shown in FIG. 10. The flexible element 54 may be a cable, a spring, or a cord similar to a bungee cord. The flexible element 54 may be fastened to the ends of the posts A, B, or they may have their opposite end secured in the cavities 22, 28 by C-clips 55 having a diameter greater than the diameter of the bore 36. The flexible element 54 prevents the sign post A from being propelled when the shear section 16 breaks, which might pose a danger to the vehicle occupants or pedestrians in the area. The disposition of the flexible element 54 within the cylindrical bore 36 protects the flexible element 54 from damage to corrosion or accidental severance, which might occur with the flexible element 54 disposed outside the coupler 10.

The coupler 10 may also be provided with a self-locking mechanism 56 for retaining the sign post A in the coupler and the coupler 10 on the ground post B. As shown in FIG. 10, the self locking mechanism 56 includes a bore 58 defined in the side walls 20, 26, the bore being threaded towards the exterior of the coupler 10. A ball 60 is disposed in the bore 58, the ball 60 having a diameter slightly greater that the diameter of the outlet 62 of the bore 58 into the cavities 22, 28. The ball 60 is spring biased by a compression spring 64 retained in the bore 58 by a set screw 66. When the post A or B is inserted into its respective cavity 22 or 28, the ball 60 is urged backwards into the bore 58, further compressing the spring 64, the ball 60 maintaining sufficient pressure against the post A or B to maintain the post A, B in its respective cavity 22, 28 so that the post A, B cannot be removed without loosening the set screw 66.

It is to be understood that the present invention is not limited to the embodiments described above, but encompasses any and all embodiments within the scope of the following claims. It will be apparent, for example, that although the coupler 10 is shown with symmetrical sign post 12 and ground post 14 sockets, the coupler may be made with the cavity 22 defined by the sign post socket 12 having a different cross-sectional shape than the cavity 28 defined by the ground post socket 14 so that a sign post A may be coupled to a ground post B having a different cross-sectional shape.

I claim:

1. A sign post coupler for joining a highway sign post to a ground post, comprising an integral body cast in one-piece, the body being hollow and tubular and having:
   a) a sign post socket, the socket having a bottom wall and at least one side wall disposed about the bottom wall, defining a cavity adapted for receiving an end of a sign post, said bottom wall tapering downward and inward about its perimeter in order to define a first circular base;
   b) a ground post socket, the socket having a top wall and at least one side wall disposed about the top wall, defining a cavity adapted for receiving an end of a ground post, said top wall tapering upward and inward about its perimeter in order to define a second circular base; and
   c) a shear section disposed between said sign post socket and said ground post socket, the shear section having a cylindrical wall extending between said first circular base and said second circular base, the shear section having an annular groove defined in the exterior of the cylindrical wall;
   (d) said coupler having a cylindrical bore of uniform diameter defined therein extending through the bottom wall of said sign post socket, said shear section, and the top wall of said ground post socket, wherein said shear section is circular in cross section and wherein the inside and outside perimeters of said shear section are smaller than the inside and outside perimeters, respectively, of said sign post socket and said ground post socket; and whereby the shear section breaks in order to separate said sign post socket from said ground post socket when said sign post is impacted by a motor vehicle in motion.

2. The sign post coupler according to claim 1, wherein said coupler is made from ductile iron having a tensile strength of about 65,000 pounds per square inch, a yield strength of about 45,000 pounds per square inch, and an elongation of about 12%.

3. The sign post coupler according to claim 1, wherein the cross-sectional shape of the cavity defined by at least one of said sockets is a trapezoid merged to an elongated rectangular slot, said socket being adapted for receiving an end of a conventional highway sign post having a U-shaped cross section.

4. The sign post coupler according to claim 1, wherein the cross-sectional shape of the cavity defined by at least one of said sockets is square, the side walls of said socket further comprising a plurality of corners reinforced by an extra thickness of material, said socket being adapted for receiving an end of a highway sign post having a square shaped cross section.

5. The sign post coupler according to claim 1, wherein the cross-sectional shape of the cavity defined by at least one of said sockets is rectangular, the side walls of said socket further comprising a plurality of corners reinforced by an extra thickness of material, said socket being adapted for receiving an end of a highway sign post having a rectangular shaped cross section.

6. The sign post coupler according to claim 1, wherein said sign post socket further comprises a pair of slots defined in said at least one side wall, the slots being aligned, and wherein said ground post socket further comprises a pair of slots defined in said at least one side wall, the slots being aligned, the slots defined in said sockets being adapted for receiving a fastener extended through the slots.

7. The sign post coupler according to claim 6, wherein said sign post socket further comprises a pair of holes defined in said at least one side wall, the holes being aligned, and wherein said ground post socket further comprises a pair of holes defined in said at least one side wall, the holes being aligned, the holes defined in said sockets being adapted for receiving a fastener extended through the slots.

8. The sign post coupler according to claim 1, wherein said shear section further comprises a plurality of holes defined transversely through said annular groove, whereby the cross-sectional area of said shear section is reduced.

9. The sign post coupler according to claim 1, further comprising an adjustable strap made from metal removable attached about the circumference of said annular groove, whereby the cross sectional area of said shear section is increased.

10. The sign post coupler according to claim 1, further comprising a flexible element having a first end and a second end, the flexible element being disposed within said hollow shear section, and further comprising retainer means for retaining the first end of said flexible element disposed within said sign post socket and the second end of said flexible element disposed within said ground post socket.

11. The sign post coupler according to claim 10, wherein said flexible element is resilient.

12. The sign post coupler according to claim 10, wherein said flexible element comprises a resilient cord and wherein said retainer means comprises a first C-clip attached to the first end of said cord and a second C-clip attached to the second end of said cord.

13. The sign post coupler according to claim 1, wherein said sign post socket and said ground post socket each further comprise at least one self-locking mechanism, the self-locking mechanism comprising:
   a) a bore defined through the side wall of said socket, the bore being threaded for at least a portion of the length of the bore and having an outlet within the cavity defined by said socket;

b) a ball disposed within said bore, said ball having a diameter slightly greater than the outlet of said bore;

c) a set screw removably disposed in said bore; and d) a compression spring disposed between said set screw and said ball;

wherein said compression spring biases said ball against the outlet so that a portion of the ball extends within the cavity, the self-locking mechanism being adapted for retaining a highway post within said socket.

14. A sign post coupler for joining a highway sign post to a ground post, comprising an integral body cast in one-piece, the body being hollow and tubular, the body being made from ductile iron having a tensile strength of about 65,000 pounds per square inch, a yield strength of about 45,000 pounds per square inch, and an elongation of about 12%. and having:

a) a sign post socket, the socket having a bottom wall and a plurality of side walls disposed 360° about the perimeter of the bottom wall, defining a cavity, the cavity having a cross-sectional shape of a trapezoid merged to an elongated rectangular slot, said socket being adapted for receiving an end of a conventional highway sign post having a U-shaped cross section, said bottom wall tapering downward and inward about its perimeter in order to define a first circular base;

b) a ground post socket, the socket having a top wall and a plurality of side walls disposed 360° about the perimeter of the top wall, defining a cavity, the cavity having a cross-sectional shape of a trapezoid merged to an elongated rectangular slot, said socket being adapted for receiving an end of a conventional highway ground post having a U-shaped cross section, said top wall tapering upward and inward about its perimeter in order to define a second circular base; and c) a shear section disposed between said sign post socket and said ground post socket, the shear section being hollow and having a cylindrical wall extending between said first circular base and said second circular base, the shear section having an annular groove defined in the exterior of the cylindrical wall;

said coupler having a cylindrical bore of uniform diameter defined therein extending through the bottom wall of said sign post socket, through said shear section, and through the top wall of said ground post socket, wherein said shear section is circular in cross section and wherein the inside and outside perimeters of said shear section are smaller than the inside and outside perimeters, respectively, of said sign post socket and said ground post socket, and whereby the shear section breaks in order to separate said sign post socket from said ground post socket when said sign post is impacted by a motor vehicle in motion.

15. The sign post coupler according to claim 14, wherein said sign post socket further comprises a pair of slots defined in said at least one side wall, the slots being aligned, and wherein said ground post socket further comprises a pair of slots defined in said at least one side wall, the slots being aligned, the slots defined in said sockets being adapted for receiving a fastener extended through the slots.

16. The sign post coupler according to claim 14, further comprising:

a) a flexible, resilient cord, said cord having a first end and a second end;

b) a first C-clip, the first end of said flexible cord being retained in said sign post socket by the first C-clip, the C-clip having a diameter slightly greater that the diameter of said cylindrical bore; and c) a second C-clip, the second end of said flexible cord being retained in said ground post socket by the second C-clip, the C-clip having a diameter slightly greater that the diameter of said cylindrical bore.

17. A sign post coupler for joining a highway sign post to a ground post, comprising an integral body cast in one-piece, the body being hollow and tubular, the body being made from ductile iron having a tensile strength of about 65,000 pounds per square inch, a yield strength of about 45,000 pounds per square inch, and an elongation of about 12%. and having:

a) a sign post socket, the socket having a bottom wall and a plurality of side walls disposed 360° about the perimeter of the bottom wall, defining a cavity, the cavity having a square shape in cross section, said bottom wall tapering downward and inward about its perimeter in order to define a first circular base, the side walls being joined by a plurality of corners reinforced by an extra thickness of material, said socket being adapted for receiving an end of a highway sign post having a square shape in cross section;

b) a ground post socket, the socket having a top wall and a plurality of side walls disposed 360° about the perimeter of the top wall, defining a cavity, the cavity having a square shape in cross section, said top wall tapering upward and inward about its perimeter in order to define a second circular base, the side walls being joined by a plurality of corners reinforced by an extra thickness of material, said socket being adapted for receiving an end of a highway ground post having a square shape in cross section; and c) a shear section disposed between said sign post socket and said ground post socket, the shear section being hollow and having a cylindrical wall extending between said first circular base and said second circular base, the shear section having an annular groove defined in the exterior of the cylindrical wall;

said coupler having a cylindrical bore of uniform diameter defined therein extending through the bottom wall of said sign post socket, through said shear section, and through the top wall of said ground post socket, wherein said shear section is circular in cross section and wherein the inside and outside perimeters of said shear section are smaller than the inside and outside perimeters, respectively, of said sign post socket and said around post socket, and whereby the shear section breaks in order to separate said sign post socket from said ground post socket when said sign post is impacted by a motor vehicle in motion.

18. The sign post coupler according to claim 17, wherein said sign post socket further comprises a pair of slots defined in said at least one side wall, the slots being aligned, and wherein said ground post socket further comprises a pair of slots defined in said at least one side wall, the slots being aligned, the slots defined in said sockets being adapted for receiving a fastener extended through the slots.

19. The sign post coupler according to claim 18, further comprising:

a) a flexible, resilient cord, said cord having a first end and a second end;

b) a first C-clip, the first end of said flexible cord being retained in said sign post socket by the first C-clip, the C-clip having a diameter slightly greater that the diameter of said cylindrical bore; and c) a second C-clip, the second end of said flexible cord being retained in said ground post socket by the second C-clip, the C-clip having a diameter slightly greater that the diameter of said cylindrical bore.

* * * * *